(12) United States Patent
Hatanaka

(10) Patent No.: US 7,905,933 B2
(45) Date of Patent: Mar. 15, 2011

(54) EXHAUST GAS PURIFIER AND FILTER REGENERATOR

(75) Inventor: Yoshihiro Hatanaka, Kawasaki (JP)

(73) Assignee: National University Corporation, Tokyo University of Marine Science and Technology, Tokyo (JP)

( * ) Notice: Subject to any disclaimer, the term of this patent is extended or adjusted under 35 U.S.C. 154(b) by 345 days.

(21) Appl. No.: 12/281,837

(22) PCT Filed: Mar. 2, 2007

(86) PCT No.: PCT/JP2007/054078
§ 371 (c)(1),
(2), (4) Date: Sep. 5, 2008

(87) PCT Pub. No.: WO2007/102436
PCT Pub. Date: Sep. 13, 2007

(65) Prior Publication Data
US 2009/0084077 A1    Apr. 2, 2009

(30) Foreign Application Priority Data

Mar. 6, 2006  (JP) .................................. 2006-059462

(51) Int. Cl.
*B01D 39/00*  (2006.01)
*B01D 24/00*  (2006.01)
*B01D 39/06*  (2006.01)
*B01D 39/14*  (2006.01)
*F23J 11/00*  (2006.01)
*B01D 50/00*  (2006.01)

(52) U.S. Cl. ............. 55/282.3; 55/522; 55/523; 55/524; 422/168; 422/169; 422/170; 422/171; 422/172; 422/177; 422/178; 422/179; 422/180; 422/181; 422/182

(58) Field of Classification Search ............ 55/522–524, 55/282.3; 422/168–172, 177–182
See application file for complete search history.

(56) References Cited

U.S. PATENT DOCUMENTS

| 5,065,574 A | 11/1991 | Bailey |
| 5,240,470 A * | 8/1993 | Wright ............................... 95/58 |
| 5,547,495 A * | 8/1996 | Wright ............................... 96/74 |
| 2005/0262817 A1 | 12/2005 | Hatanaka |

FOREIGN PATENT DOCUMENTS

| JP | 5 500097 | 1/1993 |
| JP | 2004 204824 | 7/2004 |
| JP | 2005 232971 | 9/2005 |
| WO | 2004 059135 | 7/2004 |

* cited by examiner

*Primary Examiner* — Walter D Griffin
*Assistant Examiner* — Amber Orlando
(74) *Attorney, Agent, or Firm* — Oblon, Spivak, McClelland, Maier & Neustadt, L.L.P.

(57) ABSTRACT

An exhaust gas cleaning apparatus and a filter regeneration apparatus that are capable of cleaning a large volume of exhaust gas without any increase in size of a nonmagnetic member around which a working coil for induction heating is wound. The exhaust gas cleaning apparatus includes a particulate collecting section and a filter regenerating section placed next to each other in the flow direction of an exhaust gas, and a movable frame. The movable frame holds an extension of a filter unit extending from a casing of the particulate collecting section beyond the support frame of the filter regenerating section, and can move the filter unit in the axial direction of the casing. When the filter unit moved by the movable frame passes through the filter regenerating section, a corresponding part of a holding frame disposed in the filter unit is continuously induction-heated to burn collected particulates, such that the filter unit can be regenerated.

7 Claims, 3 Drawing Sheets

EXHAUST GAS PURIFIER AND FILTER REGENERATOR

CROSS-REFERENCE TO PRIORITY APPLICATIONS

The present application is the U.S. National Phase Application under 35 U.S.C. §371 of International Application PCT/JP2007/054078 filed Mar. 2, 2007, and claims priority to JP 2006-059462 filed Mar. 6, 2006, the entire contents of each of which are hereby incorporated herein by reference.

TECHNICAL FIELD

The present invention relates to an exhaust gas cleaning apparatus and a filter regeneration apparatus for removing particulates in an exhaust gas of, for example, a diesel engine, a boiler or an incinerator.

BACKGROUND ART

Various forms of diesel particle filters (DPFs) for automobiles have been developed due to the particulate matter emitted from diesel engines causing lung cancer, asthma or allergies. On the other hand, in marine diesel engines, fuel oil of high sulfur content is used, so that it is difficult to apply a technique for the collection, low-temperature burning and removal of particulate matter, that is, particulates, by the combination of an oxidation catalyst and a ceramic filter used for automobiles.

Thus, as described in WO 2004-059135, the inventor of the present application has developed an apparatus for removing fine particles in exhaust gas, wherein a filter unit for collecting particulates in the exhaust gas is stored in a cylindrical ceramic housing, and a high-frequency alternating current is passed from a high-frequency inverter to a working coil wound around the outer peripheral part of the housing to generate an alternating magnetic flux, which induces an eddy current by the change of this magnetic flux in a metal heating member of the filter unit stored in the housing, such that a high temperature is generated in the filter unit itself to burn the collected particulates.

DISCLOSURE OF INVENTION

Such a fine particle removing apparatus is highly advantageous in that it is capable of efficiently gathering particulates for a long period independently of the characteristics of the fuel, and being able to be regenerated, and in that it has a long service life. However, the working coil has to be wound around the whole length of the filter unit on the outer peripheral part of the housing storing the filter unit. Such a housing around which the working coil for induction heating is wound has to be formed of a nonmagnetic material such as a ceramic so that it does not generate heat due to the change of the alternating magnetic flux. Such a ceramic material is fragile due to its nature, and is highly likely to be cracked due to, for example, vibration, particularly when it is increased in size as in the case of being formed into a longitudinally large cylindrical shape.

The present invention has been made under such circumstances, and is directed to provide an exhaust gas cleaning apparatus and a filter regeneration apparatus capable of cleaning a large volume of exhaust gas without any increase in the size of the nonmagnetic material around which a working coil for induction heating is wound.

In order to attain the foregoing object, according to the present invention, there is provided an exhaust gas cleaning apparatus comprising: a particulate collecting section where a filter unit to collect particulates in an exhaust gas is disposed in a casing into which the exhaust gas flows from one end; a filter regenerating section where a working coil for induction heating is wound around a support frame which is made of a nonmagnetic heat-resistant material and which is attached to the one end of the casing; and a movable frame which holds an extension of the filter unit extending from the casing to the outside of the filter regenerating section beyond the support frame and which allows the filter unit to move in an axial direction passing the one end and the other of the casing, wherein when the filter unit moved by the movable frame passes through the filter regenerating section, a corresponding part of a heating member disposed in the filter unit is continuously induction-heated to burn the collected particulates, thereby allowing the regeneration of the filter unit.

The movable frame is preferably connected to the support frame and an exhaust duct by expansion joints, respectively.

The support frame is preferably formed of a ceramic material into a cylindrical shape smaller in diameter than the casing and shorter in axial length than the filter unit.

The filter unit has a sintered nonwoven fabric filter formed by sintering a metal fiber, so that the sintered nonwoven fabric filter can also act as the heating member.

Furthermore, according to the present invention, there is provided a filter regeneration apparatus comprising: a support frame formed of a nonmagnetic heat-resistant material, the support frame being disposed at one end of a casing, the casing removing particulates in a fluid flown in from the one end by an internal filter unit and then discharging the particulates from the other end; a working coil for induction heating wound around the support frame; and a movable frame which holds an extension of the filter unit extending from the casing to the outside of the support frame beyond the support frame and which allows the filter unit to move along an axial direction passing the one end and the other of the casing, wherein when the filter unit moved by the movable frame passes through the working coil, a corresponding part of a heating member disposed in the filter unit is continuously induction-heated to burn the collected particulates.

According to the exhaust gas cleaning apparatus of the present invention, the particulate collecting section which collects particulates is placed side by side in the flow direction of the exhaust gas with the filter regenerating section which burns the collected particulates by induction heating to regenerate the filter unit, and the filter unit can be induction-heated and regenerated when passing through the filter regenerating section, thereby simultaneously achieving an increase in the size of the filter unit and a reduction in the size of the working coil and the support frame supporting the working coil.

When the movable frame is connected to the support frame and the exhaust duct by the expansion joints, the filter unit can be efficiently regenerated in a state connected to the pipe.

Furthermore, the support frame around which the working coil is wound is formed into a cylindrical shape smaller in diameter than the casing and shorter in axial length than the filter unit, such that the support frame is further reduced in size, and at the same time, the leakage of the magnetic flux during the induction heating is reduced to allow efficient induction heating. The heat resisting properties of the ceramic material forming the support frame ensure that the working coil is protected against heat generated during the induction heating.

Still further, according to the filter regeneration apparatus of the present invention, the support frame around which the working coil for induction heating is wound is disposed at one end of the casing having the filter unit disposed therein, and the filter unit can be induction-heated and regenerated when passing through the working coil, so that it is not necessary to increase the size of the working coil and the support frame supporting the working coil even when a large filter unit is used, thereby making it possible to form a compact and durable filter regeneration apparatus.

BEST MODE FOR CARRYING OUT THE INVENTION

Figure 1:
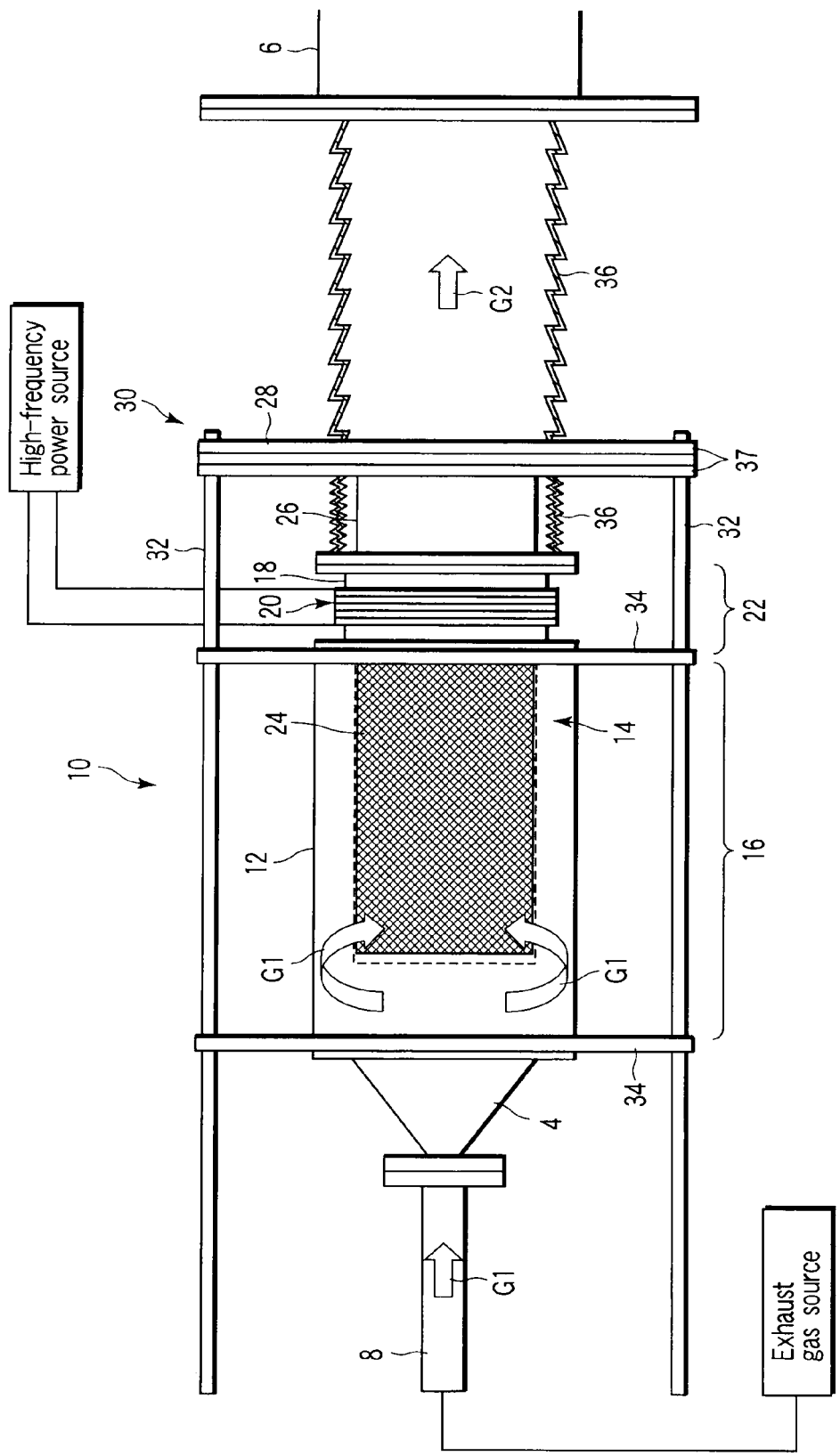
FIG. 1 is an explanatory diagram of an exhaust gas cleaning apparatus according to a preferred embodiment of the present invention.
Figure 2:
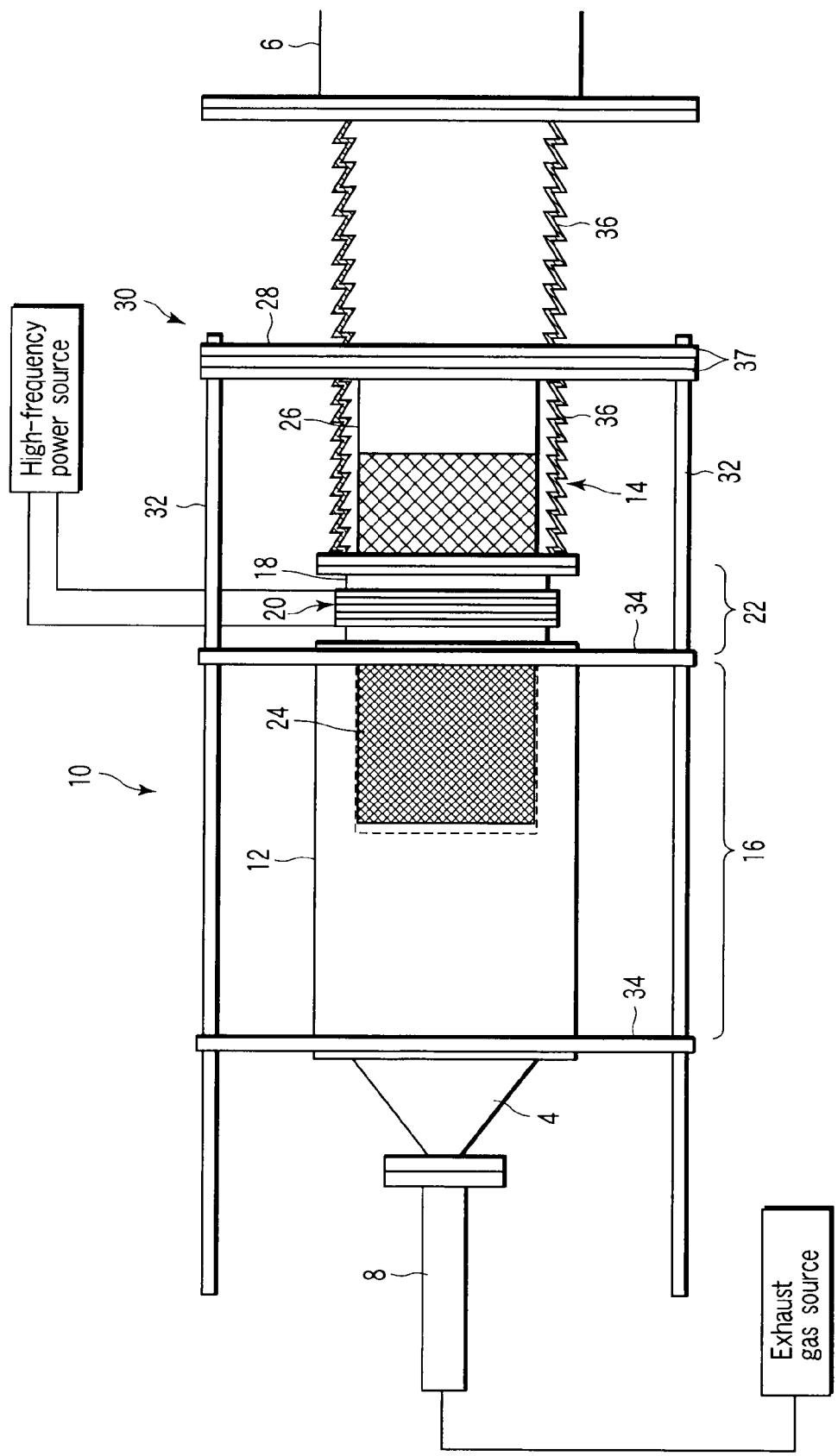
FIG. 2 is an explanatory diagram depicting the regeneration of the exhaust gas cleaning apparatus in FIG. 1.
Figure 3:
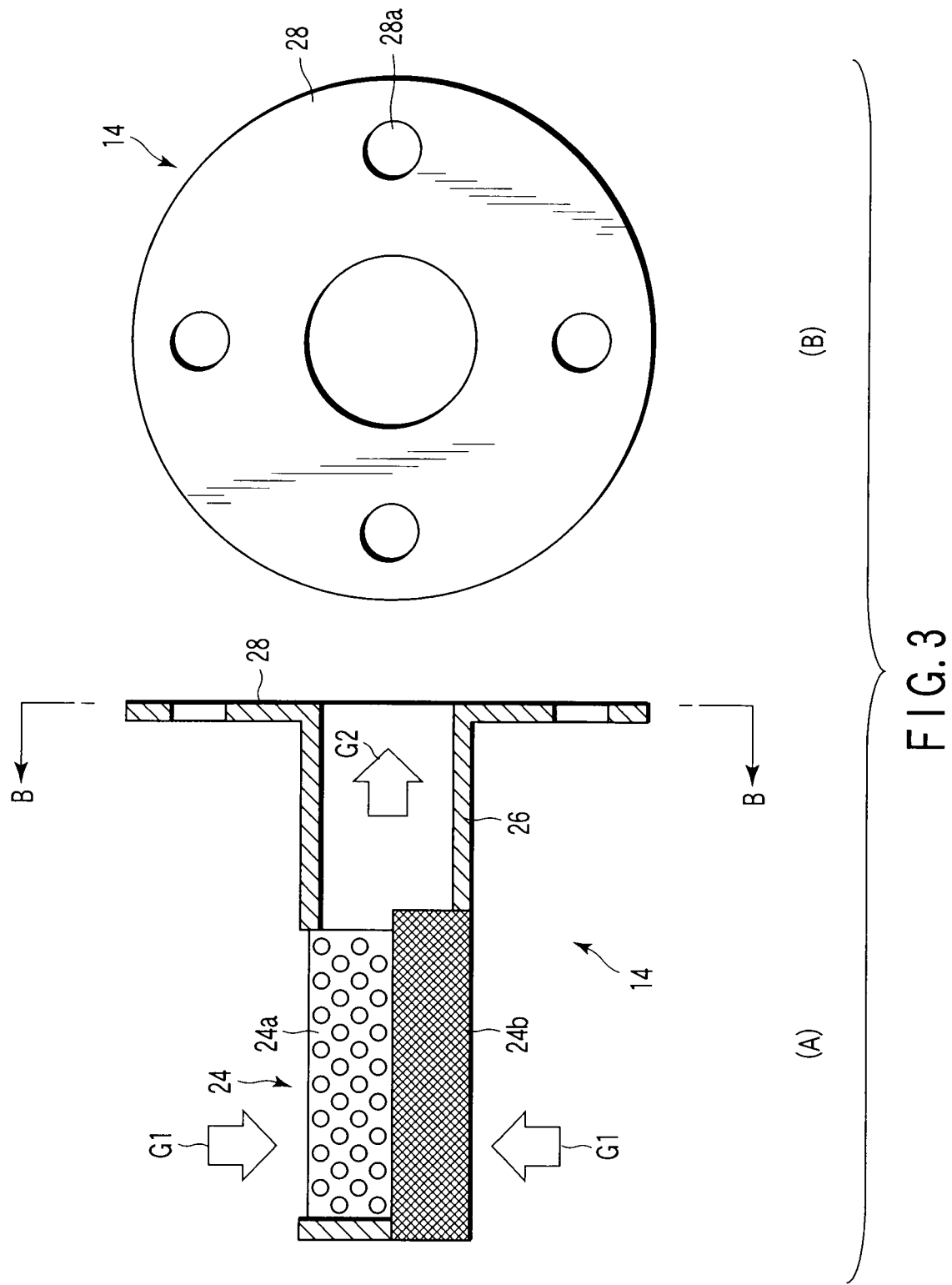
FIG. 3 shows a filter unit used in the exhaust gas cleaning apparatus, wherein (A) is a partial sectional view showing an internal structure, and (B) is a sectional view along the B-B line of (A).

FIGS. 1 to 3 show an exhaust gas cleaning apparatus 10 according to a preferred embodiment of the present invention. This exhaust gas cleaning apparatus 10 is used to remove particulate matter, that is, particulates from an exhaust gas emitted from an unshown exhaust gas source such as a boiler, waste incinerator or a main or auxiliary diesel engine of, for example, a ship.

This exhaust gas cleaning apparatus 10 is disposed between a machine-side exhaust duct 8 connected to the outlet of the exhaust gas source via an unshown flexible hose and an outside atmosphere side exhaust duct 6 in communication with the outside air. The exhaust gas cleaning apparatus 10 removes the particulates from an exhaust gas G1 that has flown in, and then discharges a clean exhaust gas G2 to the outside atmosphere side exhaust duct 6.

This exhaust gas cleaning apparatus 10 is formed of a particulate collecting section 16 where a filter unit 14 to collect particulates in an exhaust gas is disposed in a cylindrical steel casing 12, and a filter regenerating section 22 where a working coil 20 for induction heating is wound around a support frame 18 which is made of a nonmagnetic heat-resistant material and which is attached to the exit end of the casing 12.

The particulate collecting section 16 is flange-coupled to the major diameter end of a horn 4 which is flange-coupled to the machine-side exhaust duct 8 at the minor diameter end, and the exhaust gas G1 sent from the machine-side exhaust duct 8 is decelerated by the horn 4 and carried into the casing 12. Particulates in the exhaust gas G1 carried into the casing 12 are removed during the passage through the filter unit 14.

As shown in FIG. 3, the filter unit 14 disposed in the casing 12 has a filter portion 24 cylindrically structured as a whole, in which filter portion 24, a sintered nonwoven fabric filter 24b formed by sintering metal fiber is attached along the outer periphery of a cylindrical holding frame 24a in which a large number of punch holes are formed. The holding frame 24a of this filter portion 24 is closed at the end on the side of the horn 4, and open at the other end. The filter unit 14 extends by a cylindrical extension 26 from the open other end in the axial direction, and is attached to a later-described movable frame 30 via attachment holes 28a of a radially outward flange 28 formed at the tip of the extension 26. The holding frame 24a, the extension 26 and the flange 28 function as a coupling portion coupled to the later-described movable frame 30, and are preferably formed of a nonmagnetic metal such as stainless steel.

This filter unit 14 is generally disposed so that the filter portion 24 is stored in the casing 12 (see FIG. 1). The exhaust gas G1 sent from the machine-side exhaust duct 8 flows radially inwardly from the outer peripheral side of the filter portion 24. The pressure of the exhaust gas G1 acting on the sintered nonwoven fabric filter 24b is transmitted to the holding frame 24a, thereby protecting this sintered nonwoven fabric filter 24b against the pressure of the exhaust gas.

In the present embodiment, this sintered nonwoven fabric filter 24b is formed of a metal fiber available by the brand name "bekurari" from the Bekaert Asia Tokyo Office. This metal fiber is a magnetic material which contains average values of the following substances as the main components: 19.50 weight percent of Cr, 4.55 weight percent of Al, 0.25 weight percent of Y and a remaining weight percent of Fe. The maximum operating temperature of this metal fiber is 1000° C. The sintered nonwoven fabric filter 24b formed by sintering such a metal fiber generally has a high void percentage of 60 to 85, and provides a high permeation flow volume with only a small drop in pressure. As compared with a sintered product of stainless steel powder, a sintered product of this metal fiber provides a permeation flow volume of water about fourteen times higher at a filtration particle size of 4 μm.

The sintered nonwoven fabric filter 24b formed by sintering such a metal fiber can three-dimensionally take in foreign objects from the exhaust gas, and has a high capability of gathering foreign objects from the exhaust gas. Further, it is higher in heat resisting properties and mechanical strength than ceramic, and is also resistant to sulfide corrosion. Therefore, it can be suitably used as a marine DPF, which is subjected to strong vibration.

As shown in FIG. 1, when the filter portion 24 of such a filter unit 14 is disposed in the casing 12, the extension 26 extends out of the filter regenerating section 22 beyond the support frame 18 of the working coil 20 and is held by the movable frame 30 via the flange 28.

In the outer peripheral part of the flange 28 forming the coupling portion of the filter unit 14, this movable frame 30 has a plurality of guide rails 32 disposed at predetermined intervals via, for example, the attachment holes 28a. These guide rails 32 are fixed to the flange 28 on one end, and movably supported by a guide portion 34 integrally fixed to the casing 12. These guide rails 32 cantilever the filter unit 14 via the flange 28, and are movable back and forth in the axial direction linking the entry and exit ends of the casing 12.

The movable frame 30 holding the filter unit 14 in such a manner is connected to the support frame 18 of the filter regenerating section 22 and to the outside atmosphere side exhaust duct 6 via expansion joints 36, respectively. The expansion joints 36 in the present embodiment are formed of bellows-shaped expansion pipes, and flange-fixed between the flange 28 of the filter unit 14 and the support frame 18 and between the flange 28 and the outside atmosphere side exhaust duct 6. Opposite flange portions 37 of these expansion joints 36 are formed as large as the flange 28 of the filter unit 14, and fixed to the guide rails 32 of the movable frame 30 together with the flange 28.

In general, such a movable frame 30 moves the guide rails 32 in the direction of the machine-side exhaust duct 8 and disposes the guide rails 32 in proximity to the casing 12 as shown in FIG. 1, and holds the filter portion 24 of the filter unit 14 at an exhaust gas cleaning position located in the particulate collecting section 16, that is, the casing 12. The particulates in the exhaust gas G1 flown in from the machine-side exhaust duct 8 are collected by the sintered nonwoven fabric filter 24b, and after the removal of the particulates, the clean exhaust gas G2 is sent from within the extension 26 of the filter unit 14 to the outside air side exhaust duct 6 via the telescopic joints 36.

A large volume of particulates are trapped by the filter unit 14, and when the pressure difference between the entry side and the exit side becomes equal to or more than a preset value of, for example, 4 kPa, a high-frequency current is passed from an unshown high-frequency power source to the working coil 20, and the filter unit 14 is regenerated. The value of this pressure difference is preferably set to a level that does not decrease the efficiency of the normal operation of the diesel engine, boiler or incinerator.

FIG. 2 shows the step of regenerating the filter unit 14 when the pressure difference between the entry side and the exit side of the filter unit 14 has exceeded the set value as mentioned above and the regeneration of the filter unit 14 is necessary. When such a filter unit 14 is regenerated, the supply of the exhaust gas G1 is stopped or switched to another exhaust gas cleaning apparatus (not shown) arranged in parallel. Then, as shown in FIG. 2, the filter unit 14 is moved to the side of the outside atmosphere side exhaust duct 6 by the above-mentioned movable frame 30, and while its filter portion 24 is being passed through the filter regenerating section 22 with the electrified working coil 20, the collected particulates are burnt by induction heating, so that the filter unit 14 is regenerated. This regeneration step of the filter unit 14 preferably burns and removes the particulates in one back-and-forth motion but may achieve this in a plurality of back-and-forth motions. In each case, the movable frame 30 returns the filter unit 14 to the exhaust gas cleaning position shown in FIG. 1 after the regeneration of the filter portion 24 by the burning of the particulates. The movable frame 30 can be moved manually, but is preferably moved by use of an actuator, such as an electric actuator, a pneumatic actuator, a hydraulic actuator or a combination of the above.

In the filter regenerating section 22 of the present embodiment, the support frame 18, which is made of a ceramic material such as silicon nitride and supports the working coil 20 for induction heating, is formed into a cylindrical shape, and the inside diameter of this support frame 18 is preferably sized so that a slight gap is formed between the filter portion 24 and the extension 26 of the filter unit 14, and that its outside diameter is smaller than the casing 12. Such a cylindrical shape with small inside and outside diameters enables the working coil 20 to be located in proximity to the outer peripheral side of the filter unit 14, and makes it possible to reduce the leakage of a magnetic flux during the induction heating. Moreover, the axial dimension of the support frame 18 can be set to a suitable size as long as the working coil 20 necessary for the induction heating can be wound around this support frame 18. In each case, the support frame 18 can have a small and light structure shorter in axial length than the filter unit 14. Particularly, the axial length of the support frame 18 is shorter as described above, such that it is possible to inhibit damage such as cracking from being caused even in a fragile ceramic material, thereby allowing for a compact and durable structure.

The working coil 20 wound around the outer peripheral part of the support frame 18 made of the nonmagnetic heat-resistant material is formed of, for example, a litz wire or a hollow small-diameter metal tube. A high-frequency current preferably ranging, for example, from about 15 to 100 KHz is supplied to the working coil 20 from the high-frequency power source (not shown) equipped with a high-frequency inverter. When the frequency of the high-frequency current supplied to the working coil 20 is lower than 15 KHz, an audible sound is produced. On the contrary, when the frequency is higher than 100 KHz, the resistance of the working coil itself increases due to a skin effect, and efficient induction heating becomes difficult.

The sintered nonwoven fabric filter 24b of the filter portion 24 is formed of a metal fiber, so that when the filter unit 14 passes through the working coil 20 excited by the high-frequency current of the filter regenerating section 22, an eddy current flows not only through the holding frame 24a as a heating member but also through the sintered nonwoven fabric filter 24b of the metal fiber in a part which the magnetic flux produced by the working coil 20 permeates. Thus, the filter unit 14 acts as a heating member, and is heated to a high temperature (about 600° C. or more) in a short time due to Joule heat caused by resistive components at this moment. The part where the magnetic flux of the working coil 20 passes is continuously induction-heated when the filter portion 24 passes through the filter regenerating section 22 as described above, such that the emitted particulates (containing a large percentage of flammable particles) trapped in the filter unit 14 are burnt in a short time, and the filter unit 14 is thereby regenerated. The working coil 20 is disposed in proximity to the outer peripheral part of the filter portion 24 induction-heated to a high temperature, but is protected owing to the heat resisting properties of the ceramic material forming the support frame 18.

In the exhaust gas cleaning apparatus 10 formed as described above, the particulate collecting section 16 for collecting particulates is placed in the flow direction of the exhaust gas G1, G2 side by side with the filter regenerating section 22 for burning the collected particulates by induction heating to regenerate the filter unit 14. When the filter unit 14 passes through the filter regenerating section 22, the filter unit 14 can be regenerated by induction heating, so that the axial length of the filter regenerating section 22 does not have to be large even when the filter unit 14 is increased in size, thereby making it possible to reduce the size of the working coil 20 and the support frame 18 supporting the working coil 20.

Furthermore, the movable frame 30 which moves the filter unit 14 with respect to the filter regenerating section 22 is connected to the support frame 18 and the outside atmosphere side exhaust duct 6 via the expansion joints 36, such that the filter unit 14 can be efficiently induction-heated and regenerated before the temperature drops, while a connection to the duct of an exhaust apparatus is maintained. Particularly, the support frame 18 and the working coil 20 are arranged in proximity to the outer peripheral part of the filter unit 14, such that the leaking magnetic flux during the induction heating can be reduced to achieve efficient induction heating. The heat resisting properties of the ceramic material forming the support frame 18 ensure that the working coil 20 is protected against the heat generated then.

For the particulate collecting section 16 of the exhaust gas cleaning apparatus 10, a filter regeneration apparatus for burning the collected particulates is formed by the support frame 18, by the working coil 20 for induction heating wound around the support frame 18, and by the movable frame 30 for holding the extension 26 of the filter unit 14 and for moving the filter unit 14 in the axial direction of the casing 12. This filter regeneration apparatus can induction-heat and regenerate the filter unit 14 when the filter unit 14 passes through the working coil 20, so that even when a large and axially long filter unit 14 is used, the working coil 20 and the support frame 18 do not have to be increased in size, and a compact and durable filter regeneration apparatus can be formed.

In addition, while the guide rails 32 of the movable frame 30 are moved with respect to the guide portion 34 in the embodiment described above, the guide rails 32 may be fixed to the casing 12 so that the flange 28 and the flange portions 37 of the expansion joints 36 coupled to the flange 28 can move over the guide rails 32. In this case, the guide rails 32 are extended to the vicinity of the outside air side exhaust duct 6. The expansion joints 36 are not limited to the above-mentioned bellows-shaped tubular structure as long as the leakage of the gas can be prevented. For example, the expansion joints 36 may be in a nested form.

Furthermore, when the sintered nonwoven fabric filter 24b formed of a metal fiber is used in the filter portion 24 of the filter unit 14 as described above, this sintered nonwoven fabric filter 24b functions as a heating member as well, so that the holding frame 24a can be omitted or the filter portion 24 can be formed into a light structure such as a rod-like structure. On the other hand, instead of such a sintered nonwoven fabric filter 24b, it is possible to use various filters such as a ceramic fiber filter in which a ceramic continuous short fiber layer and a blanket-shaped fiber layer are stacked. When such a ceramic fiber filter is used, the above-mentioned holding frame 24a is preferably used as a heating member.

INDUSTRIAL APPLICABILITY

While a particular embodiment has been shown and described in connection with the present invention, it is apparent to those skilled in the art that various modifications and changes can be made within the scope of principles of the invention described above. For example, the exhaust gas cleaning apparatus described above is suitably mounted on a ship in particular because it simultaneously enables the size increase of the filter unit 14 as well as the size reduction of the working coil 20 and the support frame 18 supporting this working coil. However, it is also applicable to a factory, a vehicle (a heavy vehicle in particular), etc.

The invention claimed is:

1. An exhaust gas cleaning apparatus which includes a particulate collecting section having a particulate collecting filter unit disposed in a casing which allows an exhaust gas to flow in from one end and flow out from the other end, and a filter regenerating section which induction-heats a heating member disposed in the filter unit to burn particulates collected in the filter unit in order to regenerate the filter unit, the exhaust gas cleaning apparatus comprising:
   a working coil for induction heating disposed adjacently to one end of the casing; and
   a movable frame which extends from the casing beyond the working coil and which is movable in an axial direction passing the one end and the other of the casing,
   wherein the filter unit includes a coupling portion coupled to the movable frame, and a filter member held by the coupling portion, and during passage of the filter unit through the working coil, the heating member is continuously induction-heated, and the particulates collected by the filter member are burnt.

2. The exhaust gas cleaning apparatus according to claim 1, further comprising a support frame in which the working coil is wound around its outer peripheral part, the support frame being formed of a ceramic material into a cylindrical shape smaller in diameter than the casing and shorter in axial length than the filter member.

3. The exhaust gas cleaning apparatus according to claim 1 or 2, wherein the movable frame is connected to the support frame and an exhaust duct via expansion joints, respectively.

4. The exhaust gas cleaning apparatus according to claim 1, wherein the filter unit includes a sintered nonwoven fabric filter formed by sintering a metal fiber, and the sintered nonwoven fabric filter doubles as the heating member.

5. A filter regeneration apparatus which burns particulates collected by a particulate collecting filter member of a filter unit by induction-heating a heating member provided in the filter unit in order to regenerate the filter unit, the filter unit having the filter member and being disposed in a casing which allows an exhaust gas to flow in from one end and flow out from the other end, the filter regeneration apparatus comprising:
   a working coil for induction heating disposed at one end of the casing; and
   a movable frame which extends from the casing beyond the working coil and which is movable in an axial direction passing the one end and the other of the casing,
   wherein the movable frame holds an extension of the filter unit extending to the outside of the working coil beyond this working coil, and during passage of the filter unit through the working coil, a corresponding part of a heating member disposed in the filter unit is continuously induction-heated to burn particulates collected by the filter member.

6. The filter regeneration apparatus according to claim 5, further comprising a support frame in which the working coil is wound around its outer peripheral part, the support frame being formed of a ceramic material into a cylindrical shape smaller in diameter than the casing and shorter in axial length than the filter member.

7. The exhaust gas cleaning apparatus according to claim 2, wherein the filter unit includes a sintered nonwoven fabric filter formed by sintering a metal fiber, and the sintered nonwoven fabric filter doubles as the heating member.

* * * * *